United States Patent
Abe et al.

(10) Patent No.: US 6,341,679 B1
(45) Date of Patent: Jan. 29, 2002

(54) CONTROL UNIT FOR A TORQUE CONVERTER WITH A LOCKUP MECHANISM

(75) Inventors: Hiroya Abe; Yoshiharu Saito; Yoshinori Yamamoto; Toru Yamasita, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/613,288

(22) Filed: Jul. 10, 2000

(30) Foreign Application Priority Data

Aug. 26, 1999 (JP) .............................. 11-239790

(51) Int. Cl.⁷ ........................ F16H 61/14; F16H 45/02; F16D 43/25
(52) U.S. Cl. .................... 192/3.29; 192/82 T; 340/449; 340/588; 477/76
(58) Field of Search .............................. 192/3.28, 3.29, 192/3.3, 82 T; 477/62, 76, 168, 98; 701/66, 67; 74/732.1; 340/449, 588, 870.17

(56) References Cited

U.S. PATENT DOCUMENTS

| | | | |
|---|---|---|---|
| 4,509,124 A | * | 4/1985 | Suzuki et al. .......... 192/3.28 X |
| 4,733,581 A | * | 3/1988 | Hasegawa et al. ............. 477/98 |
| 4,914,982 A | * | 4/1990 | Ito et al. ........................ 477/62 |
| 5,050,717 A | * | 9/1991 | Shibayama ............ 192/82 T X |
| 5,320,202 A | * | 6/1994 | Wakahara .................... 192/3.3 |
| 5,857,162 A | * | 1/1999 | Vukovich et al. ......... 477/98 X |
| 6,019,703 A | * | 2/2000 | Black et al. ................. 477/168 |
| 6,146,309 A | * | 11/2000 | Nishino et al. ......... 477/168 X |

FOREIGN PATENT DOCUMENTS

| | | | |
|---|---|---|---|
| JP | 5-79561 | * | 3/1993 |
| JP | 7-89365 | | 4/1995 |
| JP | 10-169771 | | 6/1998 |

* cited by examiner

Primary Examiner—Rodney H. Bonck
(74) Attorney, Agent, or Firm—Armstrong, Westerman, Hattori, McLeland & Naughton, LLP.

(57) ABSTRACT

In a control unit for a torque converter with a lockup mechanism, the surface temperature of a clutch friction material in a lockup clutch is calculated with a surface temperature calculation unit B3, the surface temperature of the clutch friction material so calculated is compared with a predetermined first allowable temperature with a surface temperature comparison unit B4, and when the surface temperature of the clutch friction material is judged to have reached or exceeded the first allowable temperature, a friction material temperature reduction operating unit B5 is started to operate to reduce the surface temperature of the clutch friction material.

6 Claims, 7 Drawing Sheets

CONTROL UNIT FOR A TORQUE CONVERTER WITH A LOCKUP MECHANISM

BACKGROUND OF THE INVENTION

1. Field of the Invention

The present invention relates to a control unit for a torque converter for use in an automatic transmission for an automotive vehicle, and more particularly to a control unit for a torque converter with a lockup mechanism for locking and unlocking an impeller to and from a turbine.

2. Description of the Related Art

Torque converters are used in automatic transmissions for an automotive vehicles, and in many cases there is provided a lockup clutch for direct coupling an impeller and a turbine to the torque converter, whereby the power transmission efficiency is increased through engagement of the lockup clutch to aim at improving the fuel consumption further. In recent years, however, with a view to improving further the fuel consumption, there have been many cases where a control to partially engage the lockup clutch, that is, a slippage control of the lockup clutch is carried out. When the slippage control is carried out, the heating value from a friction material of the lockup clutch is increased and therefore the durability of a clutch friction material and a sealing member is easy to become an issue. Thus, the durability of such material and member needs to be secured.

To this end, conventionally there have been proposed various types of apparatuses and methods for protecting the lockup clutch from heat in association with the slippage of the lockup clutch. For example, JP-A-7-89365 discloses an apparatus for releasing a constant speed running control or a cruise control so as to protect a lockup clutch when the slippage of the lockup clutch becomes abnormally large during such a cruise control. In addition, JP-A-10-169771 discloses a control to reduce the engine speed when the temperature of a working oil in a torque converter becomes high abnormally.

In view of the durability of a lockup clutch, the durability of a clutch friction material is the most important, and the durability of the clutch friction itself is largely affected by the temperature thereof. Conventionally, a control to secure the durability of the clutch friction material is carried out based on the slippage of the clutch, the temperature of a torque converter fluid or the like. However, there has been a problem that such a control is carried out based on a temperature that is different from the temperature of an actual clutch friction material. To cope with this, conventionally, the safety factor of the durability of a clutch friction material has to be set larger so that the durability of the lockup clutch is not damaged even if the control thereof is carried out based on the slippage of the lockup clutch and the temperature of the torque converter. This, however, leads to the excessive quality of the lockup clutch and hence to the increase in production cost.

SUMMARY OF THE INVENTION

The present invention was made in view of the aforesaid problems and an object thereof is to provide a control unit for a torque converter with a lockup mechanism which allows the accurate evaluation of the durability of a lockup clutch friction material by accurately calculating the actual temperature of the lockup clutch friction material, so that a sufficient durability can be secured even with a small safety factor.

With a view to attaining the aforesaid object, a control unit for a torque converter with a lockup mechanism according to a first aspect of the invention is, as shown in FIG. 1, constructed such that the surface temperature of a clutch friction material of a lockup clutch is calculated by a surface temperature calculation unit B3, that the surface temperature of the clutch friction material so calculated and a predetermined first allowable temperature are compared with each other by a surface temperature comparison unit B4, and that when the surface temperature of the clutch friction material is judged to have reached or exceeded the first allowable temperature, a friction material temperature reduction operating unit B5 is then started to operate to reduce the surface temperature of the clutch friction material.

According to the construction described above, since the surface temperature of the clutch friction material is calculated accurately by the surface temperature calculation unit B3, the friction material temperature reduction operating unit B5 is started to operate to reduce the surface temperature of the clutch friction material when the surface temperature reaches or exceeds a temperature damaging the durability of the clutch friction material, in other words, the first allowable temperature, and therefore the durability of the lockup clutch can easily be secured while performing the slippage control of the lockup clutch. Note that the friction material temperature reduction operating unit is, for example, a unit fully locking up or unlocking the lockup clutch, and the control of such operations of the unit is carried out by a lockup operation control unit B6.

A control unit for a torque converter with a lockup mechanism according to a second aspect of the present invention is, as shown in FIG. 2, constructed such that the surface temperature of a clutch friction material of a lockup clutch is calculated by a surface temperature calculation unit B3, that the surface temperature of the clutch friction material so calculated and a predetermined second allowable temperature are compared with each other by a surface temperature comparison unit B11, and that a time when the surface temperature of the clutch friction material is judged to have reached or exceeded the second allowable temperature is accumulated and stored by a time accumulating unit B12, and that the lockup operation of the lockup clutch is regulated by a lockup operation regulation unit B13 since an accumulated time so accumulated and stored has reached or exceeded a predetermined allowable time. The regulation of the lockup operation is carried out by the lockup operation control unit B6.

In this apparatus, the second allowable temperature is a temperature which can be generated by a minor damage made to the friction material by the failure of the lockup operation regulation device. Since the clutch friction material is exposed to such a temperature as would cause such a damage for a long time, it cannot exhibit a predetermined performance, and therefore the lockup operation of the lockup clutch is regulated for securement of the safety. Note that it is desirable that a warning light is illuminated to indicate to the driver that the lockup clutch needs to be replaced so as to promote such a replacement.

It is preferred that the second allowable temperature is divided into a plurality of temperature ranges for plural setting, and that each of the plurality of second allowable temperatures is weighted such that the weight becomes heavier as the temperature increases, whereby a plurality of accumulated times are accumulated and stored so that whether or not the lockup operation of the lockup clutch should be carried out is judged based on the accumulated time. This enables the more accurate grasp of the degree of damage to the lockup clutch, thereby making it possible to make a more suitable judgment on the needed replacement.

In the apparatus described above, as shown in FIGS. 1 and 2, preferably the surface temperature calculation unit B3 performs operations for the surface temperature of the clutch friction material based on the temperature of the working oil in the torque converter detected for example by a fluid temperature sensor B1 and a heating value in the lockup clutch calculated by a heating value calculation unit B2, thereby making it possible to obtain substantially accurately the surface temperature of the clutch friction material.

DETAILED DESCRIPTION OF THE PREFERRED EMBODIMENTS

Figure 1:
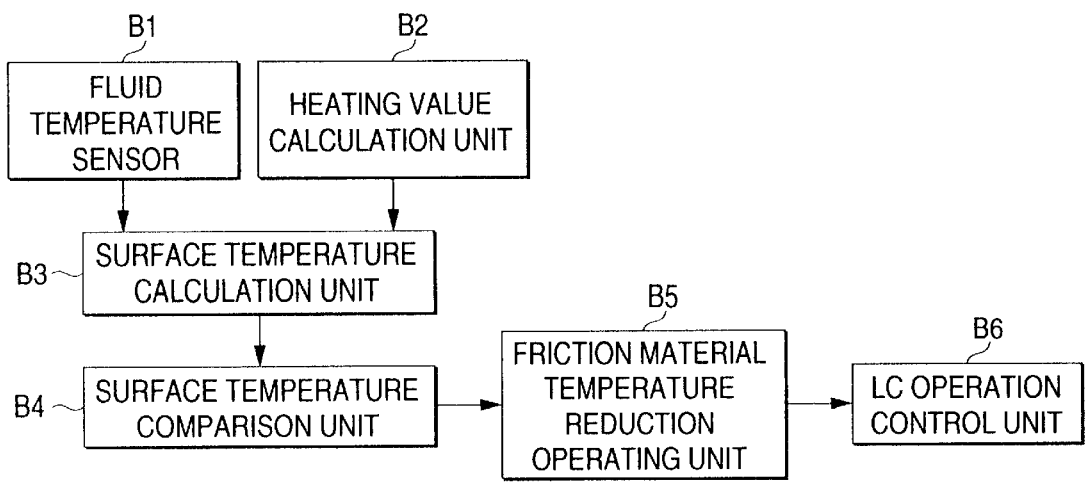
FIG. 1 is a block diagram showing the construction of a control unit according to a first aspect of the invention.
Figure 2:
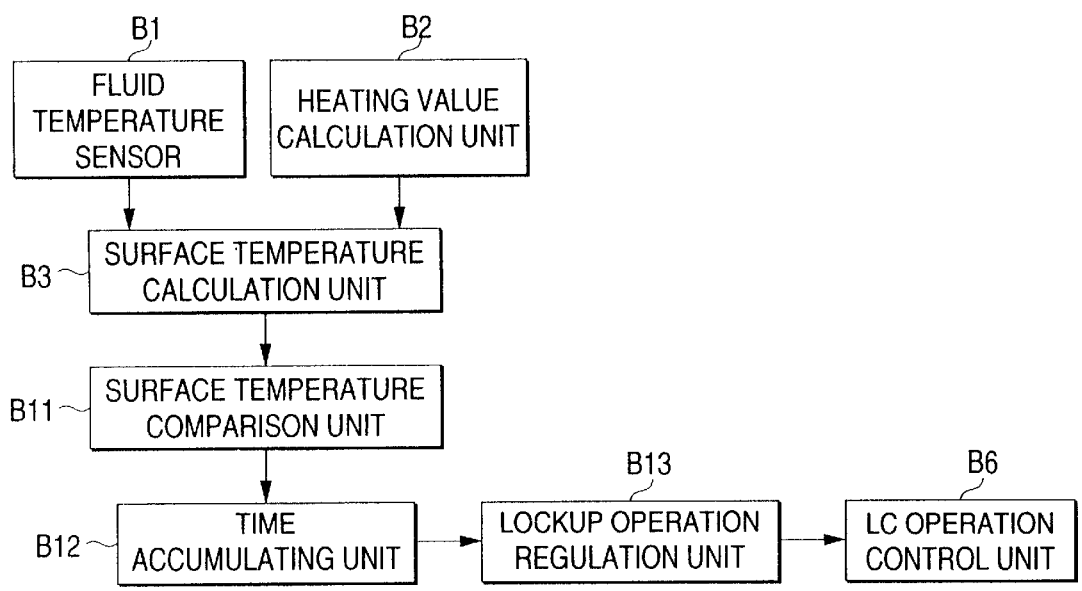
FIG. 2 is a block diagram showing the construction of a control unit according to a second aspect of the invention.
Figure 3:
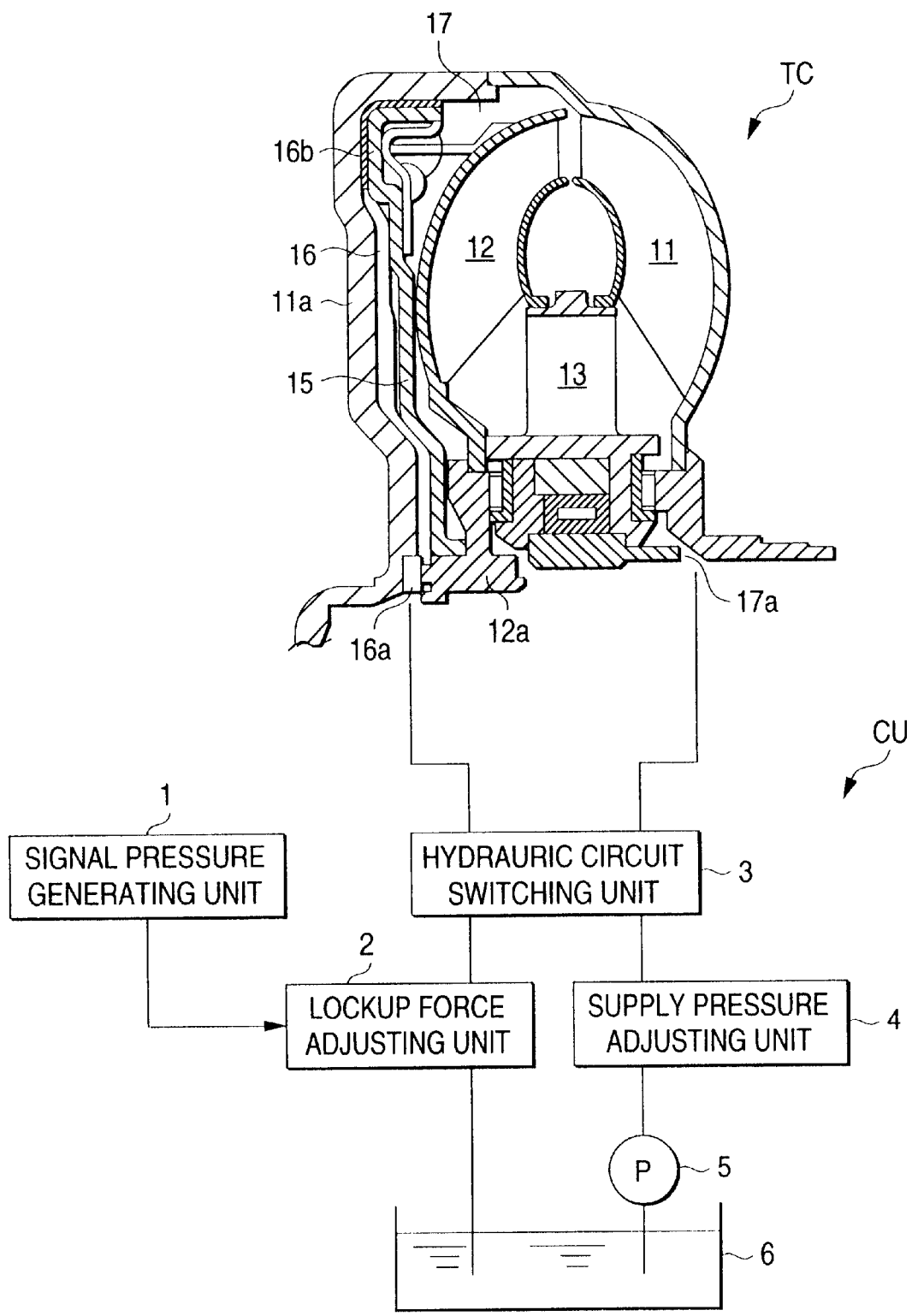
FIG. 3 is a cross-sectional view showing a torque converter with a lockup mechanism according to the invention and a block diagram showing the construction of the control unit thereof.

Referring to the accompanying drawings, a first embodiment of the invention will be described below. Shown in FIG. 3 is a torque converter TC with a lockup mechanism which is provided with a lockup control unit CU according to the invention. The torque converter TC comprises an impeller 11 connected to an engine output shaft (not shown) via a converter cover 11a, a turbine 12 disposed so as to confront the impeller 11 and connected to a transmission input shaft (not shown) via a turbine hub 12a, and a stator 13 fixedly held. A lockup piston 15 is disposed within a space surrounded by the back of the turbine 12 and an internal surface of the converter cover 11a, whereby the lockup mechanism is constituted. The space is divided by the lockup piston 15 into two chambers; a lockup release chamber 16 surrounded by the converter cover 11a and the lockup piston 15 and a lockup chamber 17 surrounded by the turbine 12 and the lockup piston 15. Note that this lockup piston 15 is mounted in such a manner as not only to move axially relative to the turbine hub 12a but also to rotate together with the turbine hub 12a.

Working oil which is supplied from a lockup fluid inlet 16a and a converter fluid inlet 17a is filled in the torque converter TC, and the turbine 12 is driven to rotate when receiving a dynamic pressure of the working oil generated when the impeller 11 is rotated by the engine. Then, a torque from the impeller 11 is amplified by virtue of the action of vanes of the impeller 11, turbine 12 and stator 13, so as to transmit the torque to the turbine 12. However, since the power is transmitted via fluid, there occurs a power transmission loss to some extent even under a condition in which the impeller 11 and the turbine 12 rotate at the same speed. In order to suppress a power transmission loss as described above, the lockup mechanism is provided for mechanically directly connecting the impeller 11 and the turbine 12 so as to rotate together in a driving condition in which the impeller 11 and the turbine 12 rotate at the same speed.

The operation of the lockup mechanism is performed by controlling the hydraulic pressures in the lockup release chamber 16 and the lockup chamber 17 by controlling in turn the pressures of working oil supplied from the lockup fluid inlet 16 and the converter fluid inlet 17. For example, the lockup piston 15 is pressed against the internal surface of the converter cover 11a with the hydraulic pressure within the lockup chamber 17 by lowering the hydraulic pressure within the lockup release chamber 16, and the lockup piston 15 and the converter cover 11a are connected together through friction between a clutch friction material 16a provided on a side of the lockup piston 15 and the internal surface of the converter cover 11a. As a result of this, the impeller 11 and the turbine 12 are engaged to each other to provide a lockup operation condition in which the impeller 11 and the turbine 12 rotate together. On the contrary to this, when the hydraulic pressure inside the lockup release chamber 16 exceeds the hydraulic pressure inside the lockup chamber 17 by supplying the working oil from the lockup fluid inlet 16a into the lockup release chamber 16, the lockup piston 15 moves away from the internal surface of the converter cover 11a to thereby produce a lockup releasing condition in which the impeller 11 and the turbine 12 rotate independently, thus producing a condition in which the torque converter TC operates.

Thus, the contact of the lockup piston 15 with the internal surface of the converter cover 11a is controlled by controlling the pressure of the working oil supplied from the lockup fluid inlet 16a and the converter fluid inlet 17a to provide or release lockup, or to provide a partial engagement (this being referred to as a slippage control of the lockup clutch). The lockup control unit CU is provided to perform these lockup controls.

The lockup control unit CU comprises a hydraulic pump 5 for supplying a working oil within an oil tank 6, a supply pressure adjusting unit 4 for adjusting a supply pressure supplied from the hydraulic pressure 5, a hydraulic circuit switching unit 3 for controlling the supply of the working oil whose pressure is adjusted by the supply pressure adjusting unit 4 to the lockup fluid inlet 16a and the converter fluid inlet 17a, a lockup force adjusting unit 2 for controlling the pressure of the working oil supplied from the lockup fluid inlet 16a to the lockup release chamber 16, and a signal pressure generating unit 1 for supplying a signal pressure for controlling the operation of the lockup force adjusting unit 2. With the lockup control unit CU constructed as described above, the hydraulic pressure within the lockup release chamber 16 is adjusted for control by the lockup force adjusting unit 2, the hydraulic pressure within the lockup chamber 17 is adjusted for control by the supply pressure adjusting unit 4, and the pressure of the supply fluid is switched for control by the hydraulic circuit switching unit 3, whereby the lockup operation of the lockup clutch is controlled.

Figure 4:
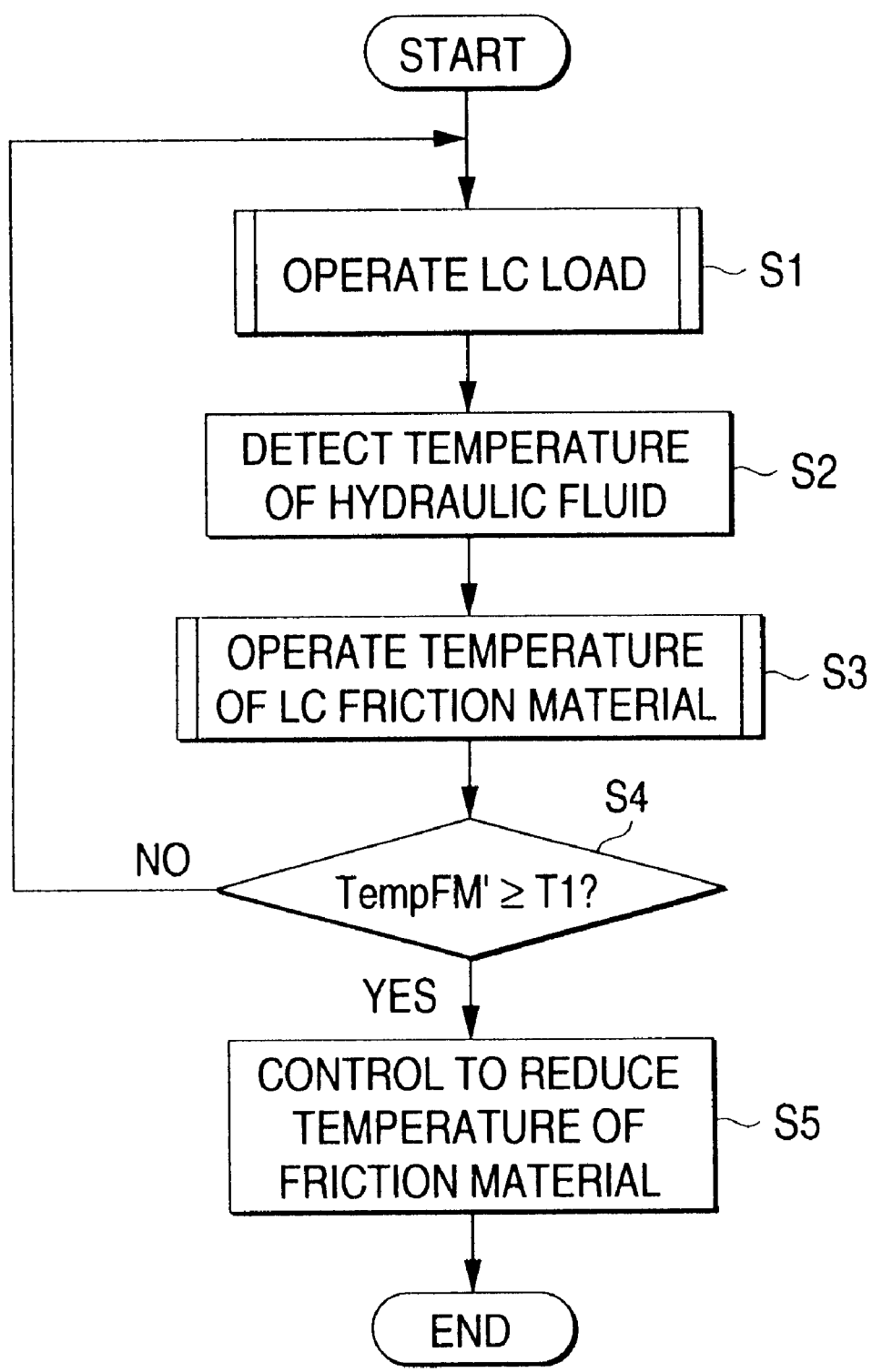
FIG. 4 is a flowchart showing the control contents of the control unit according to a first embodiment.
Figure 5:
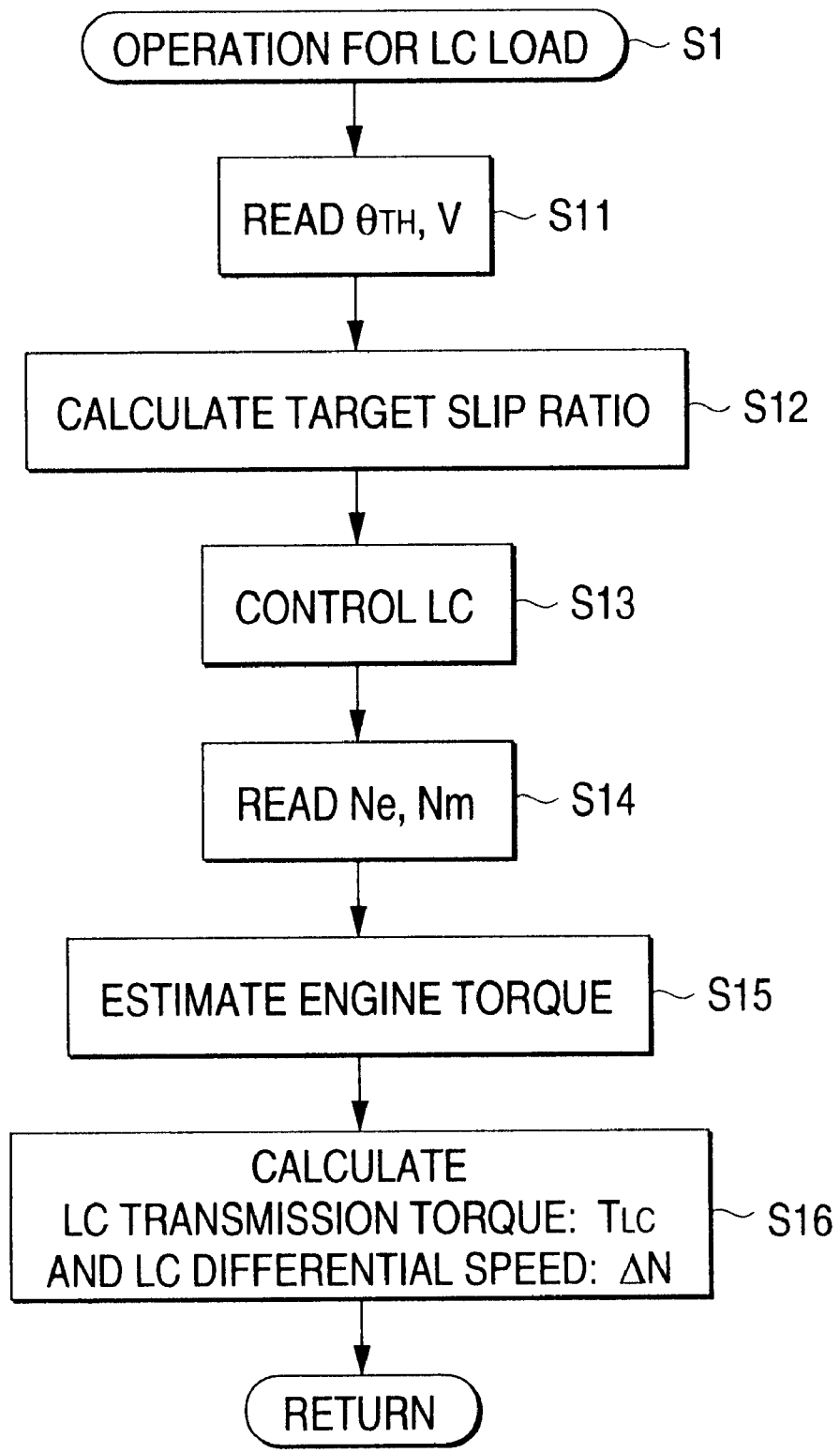
FIG. 5 is a flowchart showing the contents of step S1 shown in FIG. 4.
Figure 6:
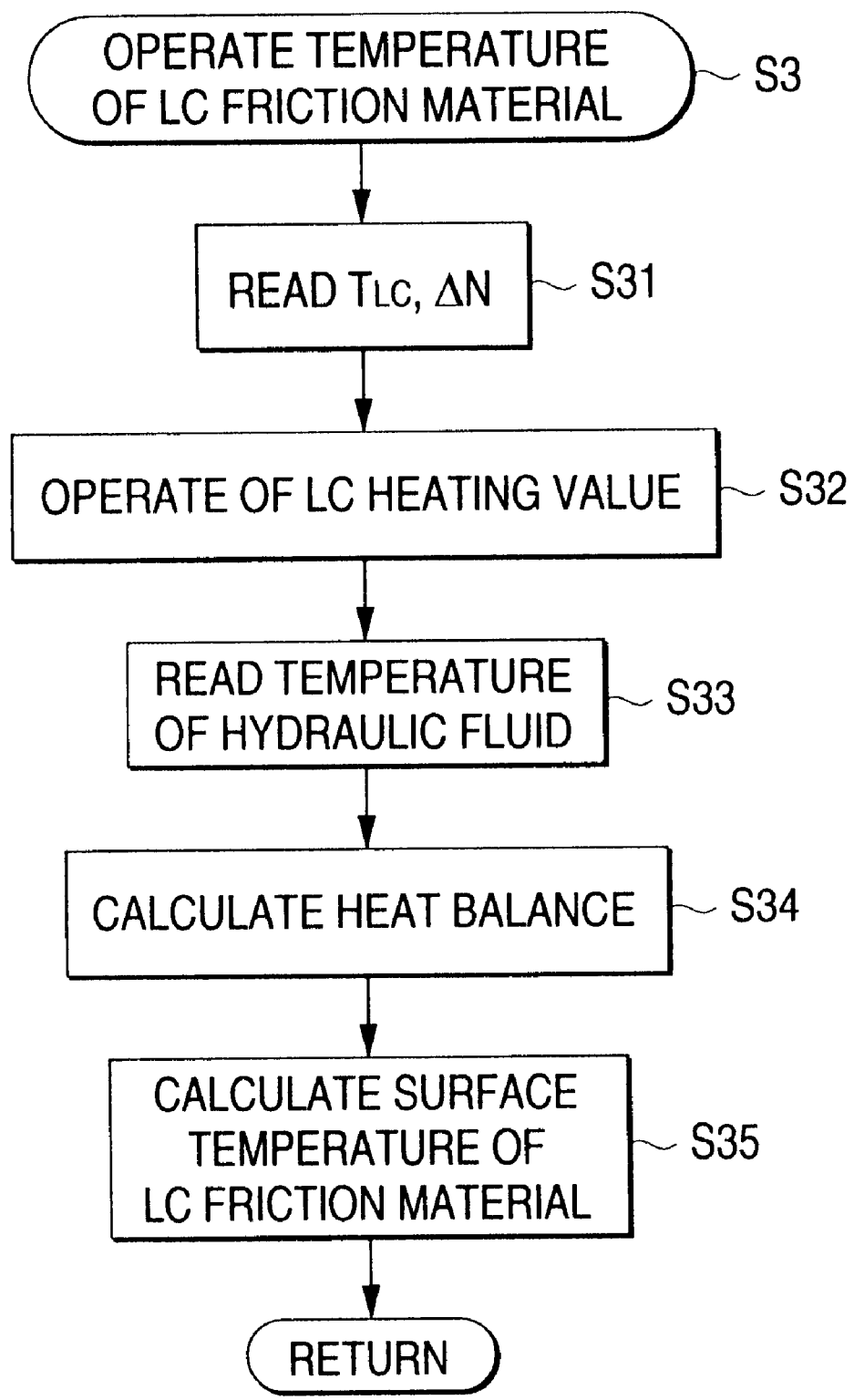
FIG. 6 is a flowchart showing the contents of step S3 shown in FIG. 4.

In a case where the lockup operation of the lockup clutch is controlled as described above (in particular, in a case where a slippage control is carried out), a heat occurs by virtue of friction between a clutch friction material 16b and the internal surface of the converter cover 11a, and there is caused thereby a risk of the durability of the clutch friction material 16a being damaged. To cope with this, in the lockup control unit CU according to the invention, operations are made for the temperature of the lockup clutch friction material 16a, which temperature is controlled so as to be prevented from becoming excessively high. This control will be described with reference to flowcharts illustrated in FIGS. 4–6.

In this control, first, in step S1, the load of a lockup clutch LC is calculated. This load calculation is performed in accordance with a flowchart shown in FIG. 5, and the engine throttle opening θTH is detected by a throttle opening sensor and the vehicle speed V is detected (step S11) by a vehicle speed sensor. A target slip ratio in the lockup slippage control is calculated based on those detected values (step S12), and the engage control of the lockup clutch is performed so as to obtain such a target slip ratio (step S13). Then, the engine speed Ne (namely, the number of revolutions of the torque converter input) and the number of revolutions Nm of the transmission input (namely, the number of revolutions of the torque converter output) are detected (step S14).

Further, in step S15, the engine output torque is estimated based on the engine throttle opening θTH and the engine speed Ne. Then, in step S16, the lockup clutch transmission torque $T_{LC}$ and lockup clutch differential speed $\Delta N$ are calculated as below.

First, the lockup clutch differential speed $\Delta N$ is a difference between the engine speed Ne (namely, the number of revolutions of the torque converter input) and the number of revolutions Nm of the transmission input (namely, the number of revolutions of the torque converter output) and can easily be obtained. On the other hand, as to the lockup clutch transmission torque $T_{LC}$, when the lockup clutch performs the slippage control, an engine torque Te is a sum of the lockup clutch transmission torque $T_{LC}$ and the hydraulic transmission torque $T_{TC}$ of the torque converter and is expressed by the following expression (1). Here, the hydraulic transmission torque $T_{TC}$ of the torque converter is obtained by the following expression (2) using the engine speed Ne and the capacity factor τ of the torque converter obtained from the number of revolutions Nm of the transmission input (or the target slip ratio). The lockup clutch transmission torque $T_{LC}$ is obtained from these expressions (1) and (2).

$$Te=T_{LC}+T_{TC} \quad (1)$$

$$T_{TC}=\tau \cdot (Ne/1000)^2 \quad (2)$$

When the lockup clutch load is calculated as described above, step S2 in FIG. 4 is performed and the temperature TempIN of the working oil of the torque converter is detected. Then, in step S3, the temperature TempFM of the friction material of the lockup clutch is operated. This operation is performed in accordance with a flowchart shown in FIG. 6 as below.

First, the lockup clutch transmission torque $T_{LC}$ and the lockup clutch differential speed $\Delta N$ which are obtained from the above operations are read (step S31), and in step S32, the heating value $Q_{LC}$ of the lockup clutch is operated. This operation is obtained by the following expression (3).

$$Q_{LC}=T_{LC} \cdot (\pi/30) \cdot \Delta N \cdot dt \quad (3)$$

Following the above, in step S33, the temperature TempIN of the working oil within the torque converter is read and based on this, the heat balance is calculated, and the temperature difference rise ratio per unit time DT/dt between the lockup friction material surface temperature and the working oil temperature is calculated (in step S34). This rise ratio DT/dt can be calculated from the following expression (4).

$$M_{LC} \cdot (DT/dt)=Q_{LC}-k \cdot \Delta T \quad (4)$$

Where, $M_{LC}$: the heat capacity at a location which slides relative to the friction material (J/° C.)

k: cooling ratio correction factor by the hydraulic fluid ((J/(° C.·sec))

$\Delta T$: difference between the surface temperature TempFM of the friction material and the working oil temperature TempIN (° C.)

Note that in the calculation using the expression (4), QLC=0 and TempFM=TempIN are set as initial conditions. In addition, the heat capacity $M_{LC}$ and the correction factor k are values that are obtained from a technical calculation or in an empirical fashion. According to the expression (4), even with the same heating value $Q_{LC}$, in a case where the heat capacity $M_{LC}$ at the location slidable relative to the friction material is larger (for example, in a case where the thickness of the converter cover 11a adapted to be engaged to the lockup clutch is larger) or in a case where the correction factor k is larger (for example, in a case where the flow quantity of the working oil is increased), the rise ratio of the surface temperature of the lockup clutch friction material is reduced.

Next, this time's surface temperature TempFM' of the friction material is obtained using the following expression (5) from the temperature difference rise ratio DT/dt calculated as described above and the friction material surface temperature TempFM obtained from the previous calculation. As below, the friction material surface temperature which changes momentarily can be obtained by repeating this calculation.

$$TempFM'=TempFM+DT/dt \quad (5)$$

when the surface temperature TempFM' of the current lockup clutch friction material is obtained as described above, the surface temperature so calculated is then compared with a first allowable temperature T1 which is set depending upon a friction material, in other words, a limit temperature which when the friction material reaches or exceeds, the durability of the frictionmaterialis affected (step S4). When the current surface temperature TempFM' of the current lockup clutch friction material is below the first allowable temperature T1, the flow returns to step S1 to continue the above calculation, while when it is equal to or higher than the first allowable temperature T1, then the flow advances to step S5 where a control to reduce the temperature of the friction material is performed. With this temperature reduction control, the control is performed for the engagement or disengagement of the lockup clutch. This eliminates a possibility that the friction material becomes higher in temperature than the first allowable temperature T1, whereby a predetermined durability of the friction material can be secured for a long time.

Figure 9:
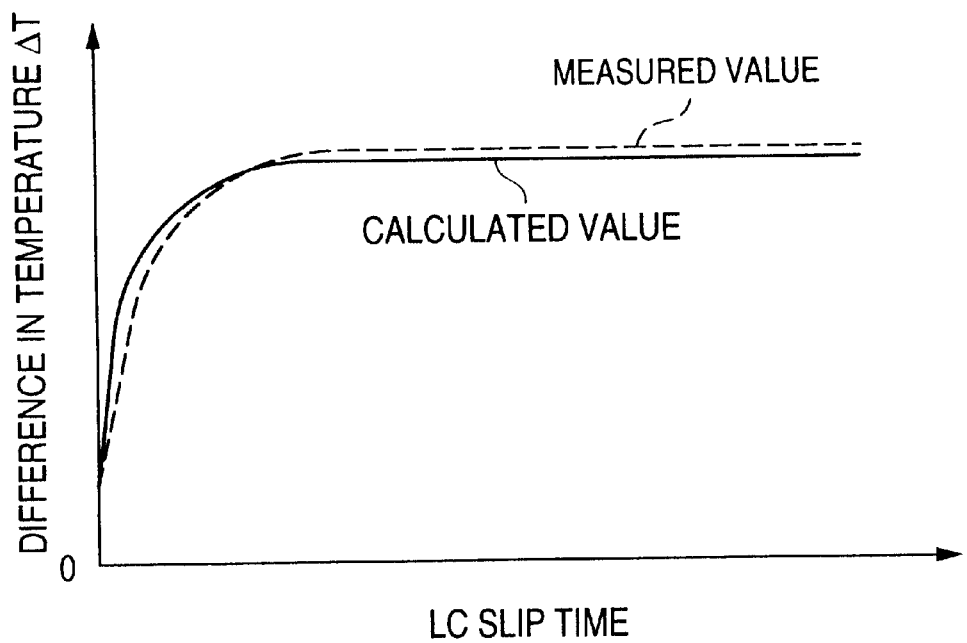
FIG. 9 is a graph showing changes in the temperature of the friction material calculated by the control unit according to the invention and the temperature of the friction material actually measured.

The surface temperature of the friction material calculated as described above and an actual one are shown in FIG. 9. As seen from the drawing, it is possible to obtain the accurate surface temperature of the friction material from the above calculation.

Figure 7:
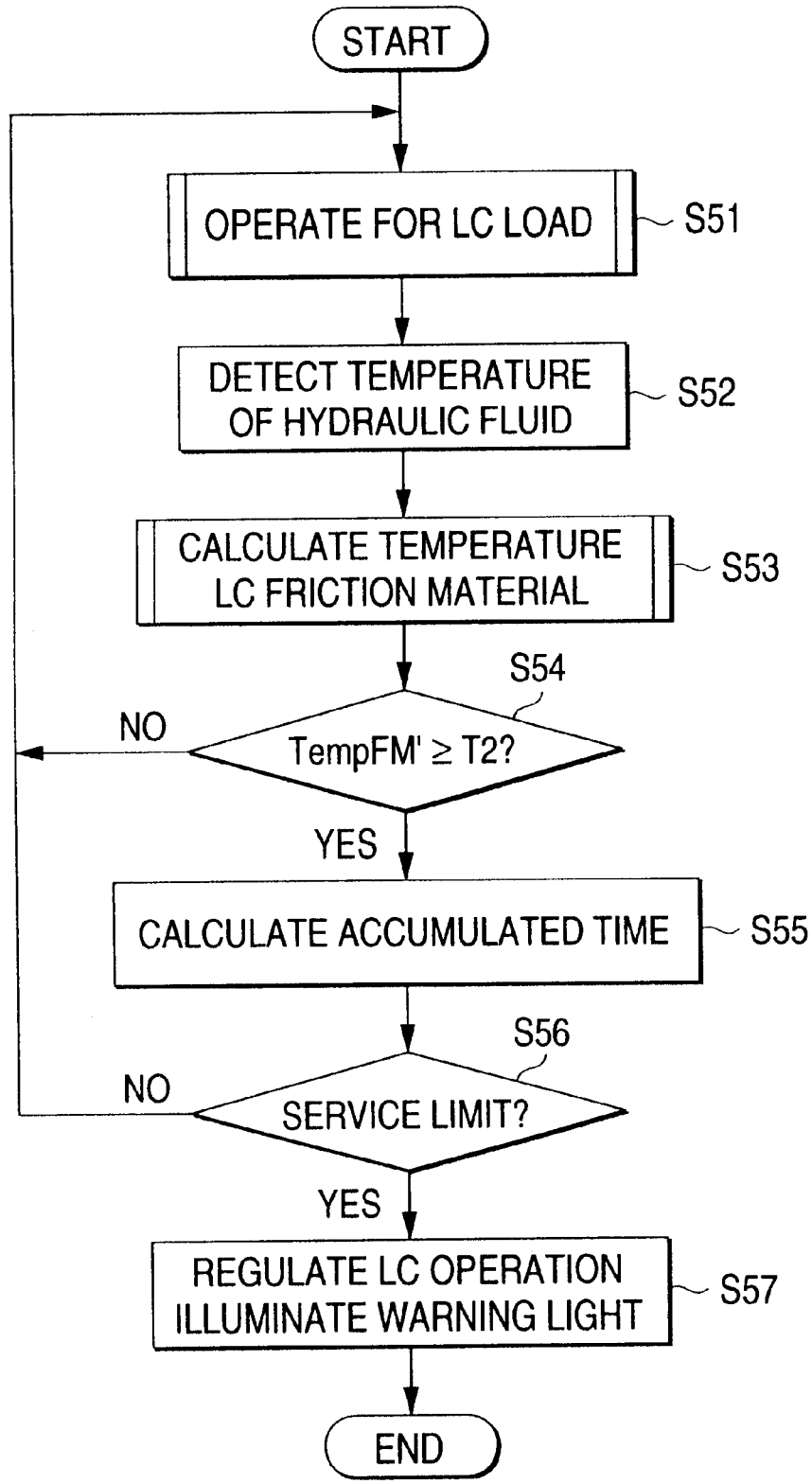
FIG. 7 is a flowchart showing the control contents according to a second embodiment.

Another lockup control according to a second embodiment of the invention will be described with reference to FIG. 7. In this control, first, in step S51, the load of the lockup clutch is calculated. This calculation is the same as that in step S1 in FIG. 4, and therefore, the description thereof is omitted here. Next, in step S52, the temperature TempIN of the working oil within the torque converter is detected, and in step S53, an operation is made for the temperature TempFM of the friction material of the lockup clutch. This operation is the same as that made in step S3 of FIG. 4, and therefore a description thereof is omitted here.

When the surface temperature TempFM' of the current lockup clutch friction material is obtained as described above, the temperature so obtained is then compared with a second allowable temperature T2 set depending upon a friction material (step S54). This second allowable temperature T2 is a temperature at which a minor damage is made to the friction material due to a failure of the lockup control unit, and a temperature which the friction material is damaged, when the temperature of the friction material reaches or exceeds the temperature T2, and if such a damage accumulates, the performance of the friction material is deteriorated, the friction material so damaged thus being required to be replaced. When the surface temperature TempFM' of the current lockup clutch friction material is below the second allowable temperature T2, the flow returns to step S51 to continue to the aforesaid calculation, whereas when it is equal to or above the second allowable temperature T2, times that the surface temperature of the lockup clutch friction material remains equal to or exceeds the second allowable temperature T2are accumulated for calculation.

Then, the flow advances to step S56, whether or not the time so accumulated exceeds the service limit of the friction material is judged, and in a case where the service limit has not yet been reached, the above calculation continues. On the contrary, in a case where the accumulated time exceeds the service limit, then the flow advances to step S57, where the lockup operation regulation control is performed. This control regulates the engagement of the lockup clutch so that the lockup clutch friction material is prevented from being used any further. Note that when this regulation control takes place, a warning light is illuminated to inform the driver that the friction material reaches the service limit to require the exchange of the friction material.

In the above control, while the times when the friction material surface temperature exceeds the second allowable temperature are only accumulated, the degree of damage to the friction material due to higher temperatures differs depending upon the extent that the surface temperature exceeds the second allowable temperature, and the higher the surface temperature increases, the greater the damage becomes. To this end, it is preferred that not only is it simply judged whether or not the surface temperature of the friction material exceeds the second allowable temperature but also it is judged whether or not the service limit is reached by dividing a certain temperature range equal to or above the second allowable temperature into a plurality temperature bands, obtaining accumulated times for each temperature band and weighting each accumulated time for each temperature band.

Figure 8:
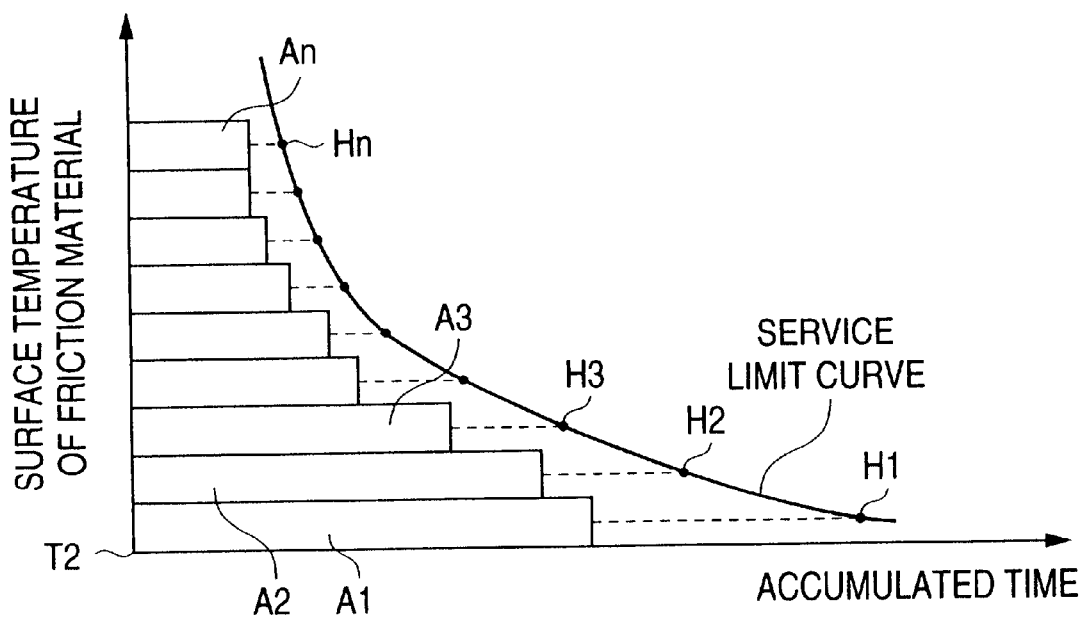
FIG. 8 is a graph showing a relationship between an accumulated time and a service limit of a friction material in the above control unit.

FIG. 8 shows an example of weighting. In this example, the temperature range above the second allowable temperature is divided into A1, A2, . . . An, and service limits H1, H2, . . . Hn are set for the respective divided temperature ranges. In this case, whether or not the friction material reaches its service limit is judged by judging whether or not the accumulated time reaches the service limit within any of the temperature ranges. Alternatively, in a case where accumulated times within the respective time ranges A1, A2, . . . And are now set as a1, a2, . . . an, it may be judged that the service limit is reached if conditions are provided which satisfies the following expression (6).

$$a_1/H_1 + a_2/H_2 + \ldots + a_n/H_n = 1 \quad (6)$$

As has been described heretofore, according to the first aspect of the invention, since the surface temperature of the clutch friction material is calculated accurately by the surface temperature calculation unit, the friction material temperature reduction operating unit is started to operate to reduce the surface temperature of the clutch friction material by allowing the lockup clutch to be fully locked up and/or be fully unlocked when the surface temperature reaches or exceeds a temperature damaging the durability of the clutch friction material, in other words, the first allowable temperature, and therefore the durability of the lockup clutch can easily be secured while performing the slippage control of the lockup clutch.

In addition, according to the second aspect of the invention, the surface temperature of the clutch friction material is accurately calculated by the surface temperature calculation unit, and in a case where this surface temperature reaches or exceeds the second allowable temperature to provide a risk of the clutch friction material being damaged, the times when the second allowable temperature is reached or exceeded are accumulated and stored. Then, in a case where the accumulated time so accumulated and stored reaches or exceeds the predetermined allowable time, the lockup operation of the lockup clutch is then regulated so as to secure the safety. Note that it is desirable that a warning light or the like may be illuminated to inform the driver that the lockup clutch needs to be replaced so as to promote such a replacement.

It is preferred that the second allowable temperature is divided into a plurality of temperature ranges for plural setting, and that each of the plurality of second allowable temperatures is weighted such that the weight becomes heavier as the temperature increases, whereby a plurality of accumulated times are accumulated and stored so that whether or not the lockup operation of the lockup clutch should be carried out is judged based on the accumulated time. This enables the more accurate grasp of the degree of damage to the lockup clutch, thereby making it possible to make a more suitable judgment on the needed replacement.

In the control unit described above, preferably the surface temperature calculation unit performs operations for the surface temperature of the clutch friction material based on the temperature of the working oil in the torque converter and the heating value in the lockup clutch, thereby making it possible to obtain substantially accurately the surface temperature of the clutch friction material.

While only certain embodiments of the invention have been specifically described herein, it will apparent that numerous modifications may be made thereto without departing from the spirit and scope of the invention.

What is claimed is:

1. A control unit for a torque converter with a lockup mechanism, said torque converter including: an impeller member connected to an engine output shaft; a turbine member connected to a transmission input shaft; a stator member fixedly held; and a lockup clutch for engaging and disengaging said impeller member and said turbine member, said control unit, comprising:
   a surface temperature calculation unit calculating the surface temperature of a clutch friction material of said lockup clutch;

a surface temperature comparison unit comparing the surface temperature of said clutch friction material calculated by said surface temperature calculation unit with a predetermined allowable temperature; and a friction material temperature reduction operating unit operating to reduce the surface temperature of said clutch friction material, wherein said friction material temperature reduction operating unit is operated, when the surface temperature of said clutch friction material is judged to be not less than said allowable temperature by said surface temperature comparison unit.

2. A control unit for a torque converter with a lockup mechanism according to claim 1, wherein said surface temperature calculation unit calculates the surface temperature of said clutch friction material based on the temperature of a working oil in said torque converter and the heating value of said lockup clutch.

3. A control unit for a torque converter with a lockup mechanism, said torque converter including: an impeller member connected to an engine output shaft; a turbine member connected to a transmission input shaft; a stator member fixedly held; and a lockup clutch for engaging and disengaging said impeller member and said turbine member, said control unit, comprising:

a surface temperature calculation unit calculating the temperature of a clutch friction material of said lockup clutch;

a surface temperature comparison unit comparing the surface temperature of said clutch friction material calculated by said surface temperature calculation unit with a predetermined allowable temperature;

a time accumulating unit accumulatively counting a time that the surface temperature of said clutch friction material is judged to be not less than said allowable temperature by said surface temperature comparison unit; and an engaging operation regulation unit regulating the engaging operation of said lockup clutch on the basis of the accumulated time counted by said time accumulating unit.

4. A control unit for a torque converter with a lockup mechanism according to claim 3, wherein said engaging operation regulation unit regulates the engaging operation of said lockup clutch when the accumulated time counted by said time accumulating unit is not less than a predetermined allowable time.

5. A control unit for a torque converter with a lockup mechanism according to claim 3, wherein a temperature range more than said allowable temperature is divided into a plurality of temperature bands, said time accumulating unit accumulates the time that the surface temperature of said clutch friction material is judged to be not less than said allowable temperature, for each temperature band, the time for each temperature band is weighted such that the weight becomes heavier as the temperature increases, and said engaging operation regulation unit regulates the engaging operation of said lockup clutch when a value obtained by accumulating the weighted time is not less than a predetermined value.

6. A control unit for a torque converter with a lockup mechanism according to claim 3, wherein said surface temperature calculation unit calculates the surface temperature of said clutch friction material based on the temperature of a working oil in said torque converter and the heating value of said lockup clutch.

* * * * *